June 30, 1936.  B. G. CARLSON  2,045,579
AUTOMATIC LEVEL CONTROL FOR AIRCRAFT
Filed April 9, 1935   2 Sheets-Sheet 1
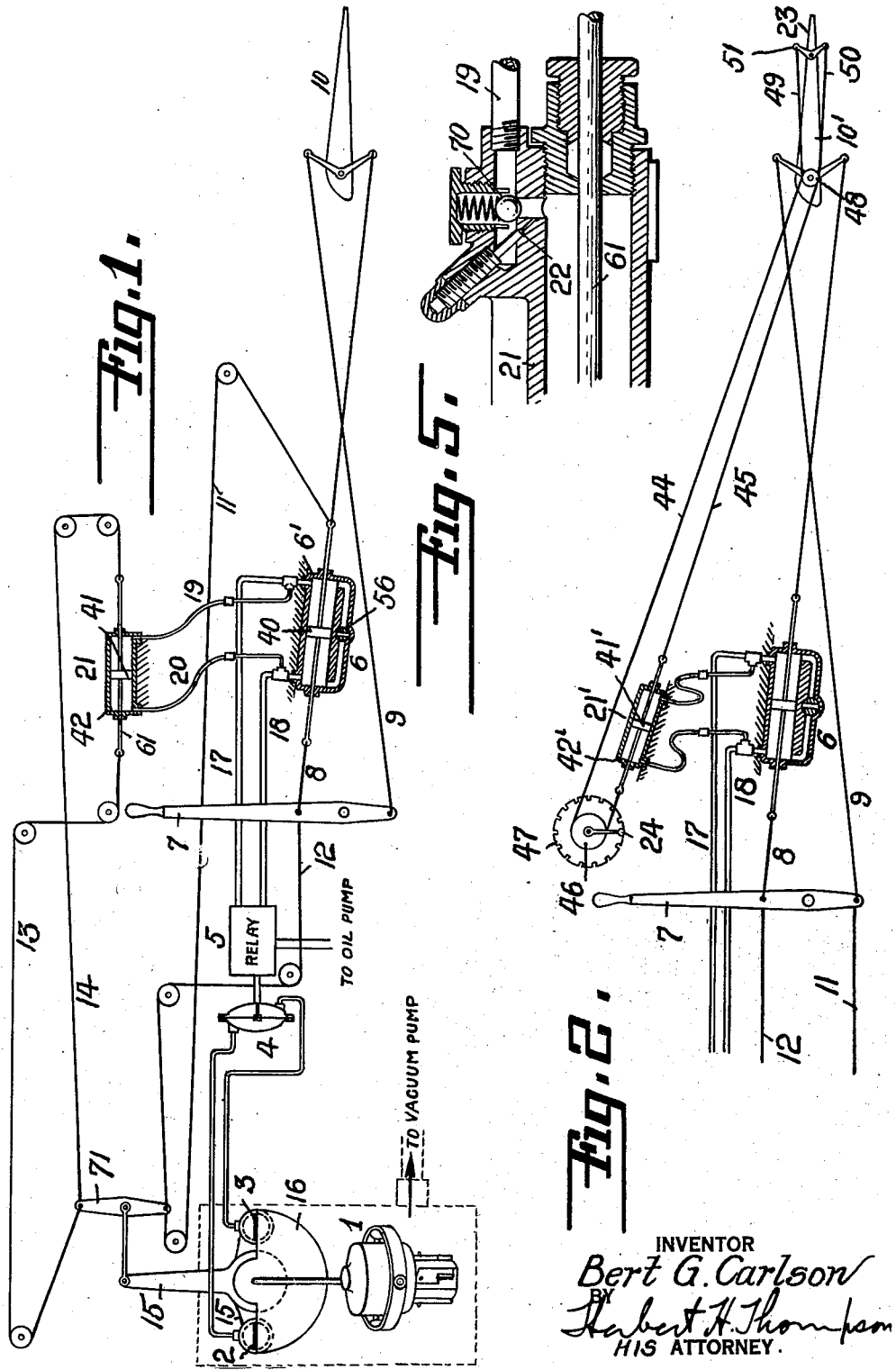
INVENTOR
Bert G. Carlson
BY
Herbert H. Thompson
HIS ATTORNEY.

June 30, 1936.   B. G. CARLSON   2,045,579
AUTOMATIC LEVEL CONTROL FOR AIRCRAFT
Filed April 9, 1935   2 Sheets-Sheet 2
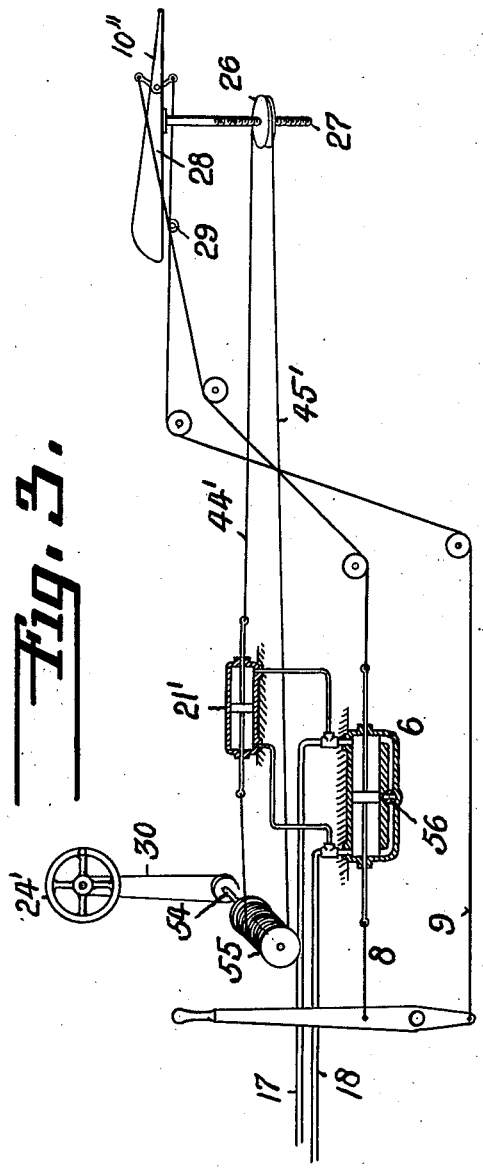
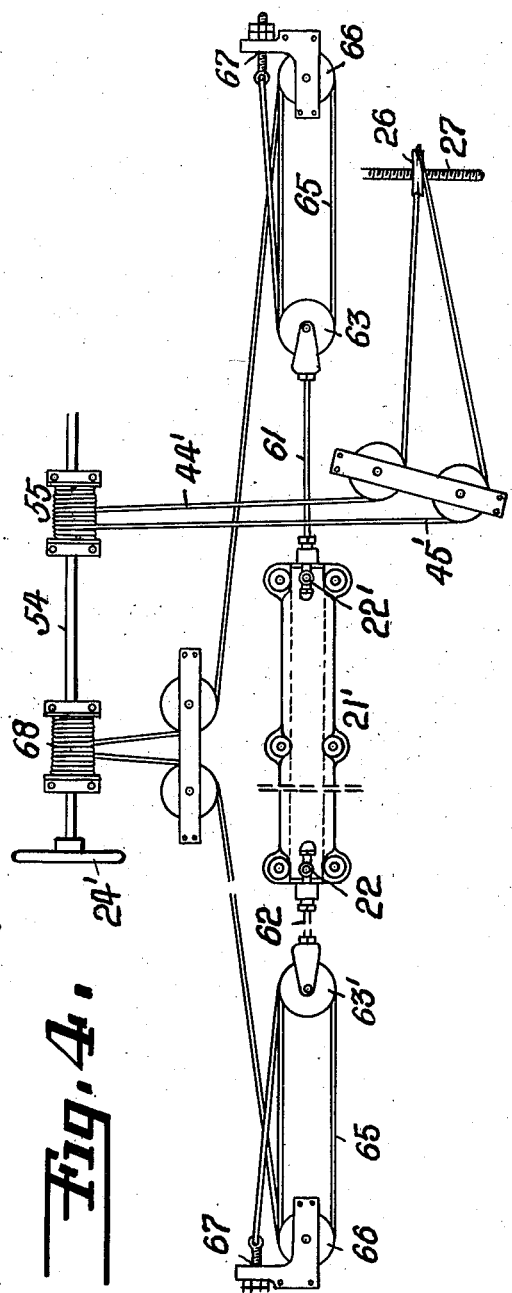
INVENTOR
Bert G. Carlson.
BY Herbert H. Thompson
HIS ATTORNEY.

Patented June 30, 1936

2,045,579

UNITED STATES PATENT OFFICE 2,045,579

AUTOMATIC LEVEL CONTROL FOR AIRCRAFT

Bert G. Carlson, Bellerose, N. Y., assignor to Sperry Gyroscope Company, Inc., Brooklyn, N. Y., a corporation of New York Application April 9, 1935, Serial No. 15,436

6 Claims. (Cl. 244—29)

This invention relates to the automatic control of aircraft, especially to the control in elevation. With a straight gyroscopic control, such as disclosed in prior Patent 1,992,970, dated March 5, 1935, for Hydro-pneumatic pilots, it is found that the aircraft may have a tendency to nose up or down and thus increase or decrease the altitude due to changes in the center of gravity of the ship. It has been proposed to correct for this defect by barometric means, as disclosed in the prior Patent 1,670,640, dated May 22, 1928, for Mechanically piloted dirigible devices, but such a system introduces extra complications and also may place a continuous load on the cables leading to the elevator due to the deflection of the elevator to compensate for the displaced center of gravity of the ship. This also reduces the ship's speed somewhat.

By my invention, I propose to eliminate one or more of the above difficulties by using an auxiliary servomotor controlled by the average or integrated movements of the main servomotor governing the elevator. The auxiliary servomotor will respond only to continuing preponderance of movement of the main servomotor in one direction as compared to the other and operates to change the relation between the aircraft, the gyroscopic or other gravitationally responsive device and the elevator so that the movements of the main servomotor, and consequently the rudder, remain equalized to each side of the middle or neutral position, while at the same time keeping the flight level with a greater degree of accuracy. Preferably I employ a compound or double elevator in connection with my system, such as a Flettner type rudder, and move only the auxiliary part of the rudder by the auxiliary servomotor. Alternatively, the auxiliary servomotor may be connected in the follow-up system from the main elevator so as to vary the relationship between the control gyroscope and the rudder.

Referring to the drawings showing several forms my invention may assume,

Fig. 1 is a diagram showing my invention as applied to an airplane having a single simple elevator.

Fig. 2 is a diagram showing it applied to an airplane equipped with a Flettner type rudder-elevator.

Fig. 3 is a diagram showing it applied to an airplane equipped with a main and auxiliary elevator, each independently operated.

Fig. 4 is a diagram showing how a large rudder movement may be obtained from one hydraulic cylinder.

Fig. 5 is a sectional detail of the auxiliary servomotor.

In the drawings, the gyroscopic or other gravitationally responsive element for controlling the stability of the airplane in elevation is shown at 1. Any suitable form of control may be used, the drawings illustrating diagrammatically a pneumatic-hydraulic system as disclosed more fully in the aforesaid prior Patent 1,992,970. As described in this patent, the relative tilting of the airplane and gyroscope relatively turns part 15 and cut-off plate 16 on the gyroscope and differentially uncovers ports 2 and 3 in part 15, the variation in pressure drop operating a differential pressure valve or diaphragm 4, which operates a hydraulic relay valve 5 controlling the main servomotor 6, the usual hand control, represented at 7, being connected to the same cables 8 and 9 that the servomotor 6 is connected to, which cables in turn are connected to the elevator 10. The cylinder 6' of said servomotor is shown as fixed, while the piston 40 is connected at both sides to cable 8. Follow-up cables 11 and 12 lead back to the part 15 containing the control ports, and which is also rotatably mounted to cause said part to follow plate 16.

Into the hydraulic pipes 17 and 18 leading from the relay to the servomotor, I tap smaller branch pipes 19 and 20 which lead to an auxiliary small servomotor 21. Preferably the inlets to said servomotor are restricted, as by needle valves 22 (Fig. 5), so that said servomotor responds much more slowly than the main servomotor to pressure changes and only moves upon persisting or repeated unbalanced pressures on one side of the piston 41. Preferably only the intake side is restricted, spring pressed check or one way valves 70 being provided to permit free return flow of the oil. Said auxiliary servomotor in this instance is connected in the follow-up system leading back to part 15 through a differential, such as lever 71, so as to change the relation between the elevator plane and the gyroscope. Said lever is shown as hinged at its middle to part 15 by link 72 and as connected at one end to follow-up cables 11, 12 and at the other end to the cables 13, 14 actuated by motor 21. As before, the cylinder 42 is fixed and piston 41 movable, the former, 42, being connected to cable 14 and the latter, 41, to cable 13 through piston rod 61. In this manner a new position of equilibrium is found so that the elevator will not be continuously moved in one direction, but will move by equal excursions about a new position of equilibrium.

Another method of accomplishing this purpose and also securing additional advantages is afforded when the airplane is equipped with some type of double elevator, such as the Flettner type rudder (Fig. 2) or main and auxiliary elevators (Fig. 3). In Fig. 2, the main rudder, which is controlled by the aviator's handle 7 and also by the standard servomotor 6, is shown at 10' and the Flettner or auxiliary rudder hinged thereto is shown at 23, and the trim control crank therefor at 24. In this instance I prefer to connect the auxiliary servomotor 21' only to the Flettner rudder 23, the cylinder 42' in this instance being fixed and the piston 41' connected at opposite sides to the cables 44 and 45 leading from trim control drum 46. A notched disc 47 is shown adjacent handle 46, which is engaged by a spring pin (not shown) on the back of said handle to hold the handle (and drum) in the position it is set in. Cables 44 and 45 pass around a drum 48 pivoted on the center of oscillation of main rudder 10', and other cables 49 and 50 lead from there to the bell crank 51 operating the Flettner rudder 23. This system has all the advantages of Fig. 1 and, in addition, takes all sustained load off the cables 8 and 9 and results in the main rudder 10' being positioned in the stream line of the ship, because the little rudder 23 is moved slowly to the average neutral position so that the main rudder follows to a position of new equilibrium to keep the ship exactly in trim and secure maximum flight efficiency. This also reduces the load placed on the automatic pilot equipment and corrects for center of gravity changes.

If the airplane is equipped with separate main or service and auxiliary or trim adjusting elevators, the auxiliary servomotor may be connected up as shown in Fig. 3. In this figure, the main servomotor 6 is directly connected to the service or main rudder surface 10''. The auxiliary servomotor 21' in this instance is connected to cables 44', 45' which turn a nut 26 fixed against axial movement to screw a threaded rod 27 up or down and thus adjust slightly the position of the auxiliary large trim adjusting surface 28 about a pivot 29. The trim control handwheel 24' operates wires 30 which turn the shaft 54 of drum 55, around which the cables 44' and 45' of servomotor 21' are wrapped.

In all forms of the invention, the main servomotor 6 is equipped with a by-pass valve 56 so that the rudder may be moved readily by hand when the automatic pilot is thrown out of operation, as explained in my aforesaid application. Preferably, the auxiliary servomotor is by-passed simultaneously with the main servomotor by one movement of the operator. This may readily be accomplished without extra mechanism, since the valve 56 necessarily operates as a by-pass for both cylinders 6 and 21 and the movements of the trim control are always slow. It will also be understood that if a lock, such as the pin and notches 47 of Fig. 2, is employed on the hand control, it is rendered inoperative when cylinder 21' is operating.

In some aircraft, such as the type shown in Fig. 3, the linear movements of the cables are much greater than the length that it is convenient to make an operating cylinder. To overcome this difficulty, I have shown in Fig. 4 a system whereby the piston of cylinder 21' need only move a fraction of the distance moved by the operating cables 44' and 45'. According to this system, the piston rods 61 and 62 of the cylinder 21' have pulleys 63 and 63' rotatably mounted on the ends thereof and the operating cable 65 in each instance leads over a fixed pulley 66, one end being anchored at 67, the other end leading to the drum 68 on the shaft 54 of the drum 55 and handwheel 24'. The other cable is similarly connected to a system of movable pulley blocks by which the movements of the piston are multiplied as desired.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an automatic pilot for aircraft, the combination with a gravitationally responsive means for maintaining level flight and the elevating rudder, of a servomotor controlled by said means for operating said rudder, a second servomotor slowly responsive to the average preponderance of movements of the first servomotor, and means operated by said second servomotor for changing the relation between the aircraft, said gravitational means and said rudder, whereby the movements of the first servomotor remain equalized on each side of the middle or neutral position.

2. In an automatic pilot for aircraft, the combination with a gravitationally responsive means for maintaining level flight and a compound elevating rudder, of a servomotor controlled by said means for operating the service part of said rudder, a second servomotor slowly responsive to the average preponderance of movements of the first servomotor, and means operated by said second servomotor for adjusting the trim control part of said rudder, whereby said service rudder remains centralized and the service cables are relieved of strain.

3. In an automatic pilot for aircraft, the combination with a gravitationally responsive means for maintaining level flight and the elevating rudder, of a servomotor controlled by said means for operating said rudder, a second servomotor slowly responsive to the average preponderance of movements of the first servomotor, and a follow back connection between said first servomotor and said gravitational means, said second servomotor being differentially connected therein, whereby the movements of the first servomotor remain equalized on each side of the middle or neutral position.

4. In an automatic pilot for aircraft, the combination with a gravitationally responsive means for maintaining level flight and a compound Flettner type rudder having a service plane and an auxiliary plane, of a servomotor controlled by said means for operating said service plane, a second servomotor slowly responsive to the average preponderance of movements of the first servomotor, and means operated by said second servomotor for operating said auxiliary plane.

5. In an automatic pilot for aircraft, the combination with a gravitationally responsive means for maintaining level flight and the elevating rudder, of a servomotor controlled by said means for operating said rudder, a second servomotor slowly responsive to the average preponderance of movements of the first servomotor, means operated by said second servomotor for changing the relation between the aircraft, said gravitational means and said rudder, and a common means for by-passing both servomotors for manual operation of the rudder.

6. In an automatic pilot for aircraft, the combination with a service rudder and a hydraulic servomotor for operating the same, of an auxiliary rudder and an auxiliary hydraulic servomotor for operating said auxiliary rudder and connected to said first named servomotor, so as to be slowly responsive to the predominant movements of said first named servomotor.

BERT G. CARLSON.